(12) United States Patent
Dieckmann et al.

(10) Patent No.: US 11,917,576 B2
(45) Date of Patent: Feb. 27, 2024

(54) V2X COMMUNICATION UNIT AND TRANSMITTING VEHICLE COMPRISING SUCH A V2X COMMUNICATION UNIT

(71) Applicant: ZF CV Systems Hannover GmbH, Hannover (DE)

(72) Inventors: Thomas Dieckmann, Pattensen (DE); Soeren Huebner, Varel (DE); Tobias Werle, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 508 days.

(21) Appl. No.: 17/185,999

(22) Filed: Feb. 26, 2021

(65) Prior Publication Data

US 2021/0185635 A1 Jun. 17, 2021

Related U.S. Application Data

(63) Continuation of application No. PCT/EP2019/071314, filed on Aug. 8, 2019.

(30) Foreign Application Priority Data

Aug. 29, 2018 (DE) ...................... 10 2018 121 059.0

(51) Int. Cl.
*H04W 4/40* (2018.01)
*G05D 1/00* (2006.01)
(Continued)

(52) U.S. Cl.
CPC ........ *H04W 64/006* (2013.01); *G05D 1/0027* (2013.01); *G05D 1/0295* (2013.01);
(Continued)

(58) Field of Classification Search
CPC ..................................................... H04W 64/00
See application file for complete search history.

(56) References Cited

U.S. PATENT DOCUMENTS 9,685,695 B2 6/2017 Sugimoto et al.
10,553,938 B2 2/2020 Wada et al.
(Continued)

FOREIGN PATENT DOCUMENTS

CN 107925854 A 4/2018
DE 102014220107 A1 4/2015
(Continued)

*Primary Examiner* — Michael T Vu
(74) *Attorney, Agent, or Firm* — LEYDIG, VOIT & MAYER, LTD.

(57) ABSTRACT

A vehicle-to-everything (V2X) communication unit, for wirelessly transmitting and/or receiving V2X signals comprising data in a vehicle, includes a plurality of V2X modules. Each respective V2X module is connected to at least one antenna configured to transmit and/or receive the V2X signals in a transmission and reception area. Each respective V2X module comprises at least a transmitting unit configured to modulate data to be transmitted via the V2X signals, and/or a receiving unit configured to demodulate data received via the V2X signals. Each V2X module includes a data interface configured to transmit the data to be transmitted and/or the data received via the V2X signal and a logic module. The plurality of V2X modules includes at least two spatially separated V2X modules. The logic module is configured to link the at least two V2X modules in such a way that a logical unit is configured.

14 Claims, 2 Drawing Sheets

(51) Int. Cl.
*G08G 1/00* (2006.01)
*H04W 64/00* (2009.01)
*H04W 92/18* (2009.01)

(52) U.S. Cl.
CPC ................ *G08G 1/22* (2013.01); *H04W 4/40* (2018.02); *H04W 92/18* (2013.01)

(56) References Cited

U.S. PATENT DOCUMENTS

| | | |
|---|---|---|
| 10,742,334 B2 | 8/2020 | Byun et al. |
| 2012/0089319 A1 | 4/2012 | Basnayake |
| 2017/0287233 A1* | 10/2017 | Nix ........................ G08G 1/166 |
| 2018/0106907 A1* | 4/2018 | Staehlin ............... H04B 1/3822 |
| 2018/0242115 A1 | 8/2018 | Kim et al. |
| 2020/0084738 A1 | 3/2020 | Nguyen |
| 2021/0136572 A1* | 5/2021 | Ingraham .............. H04W 12/65 |

FOREIGN PATENT DOCUMENTS

| | | |
|---|---|---|
| EP | 3090922 A1 | 11/2016 |
| JP | 2005080166 A | 3/2005 |
| JP | 2017022497 A | 1/2017 |
| SE | 1750416 A1 | 1/2018 |
| WO | 2018064179 A1 | 4/2018 |
| WO | WO 2018074708 A1 | 4/2018 |

\* cited by examiner

V2X COMMUNICATION UNIT AND TRANSMITTING VEHICLE COMPRISING SUCH A V2X COMMUNICATION UNIT

CROSS-REFERENCE TO PRIOR APPLICATION

This application is a continuation of International Patent Application No. PCT/EP2019/071314, filed on Aug. 8, 2019, which claims priority to German Patent Application No. DE 10 2018 121 059.0, filed on Aug. 29, 2018. The entire disclosure of both applications is incorporated by reference herein.

FIELD

The present invention relates to a vehicle-to-everything (V2X) communication unit and an ego vehicle, in particular a commercial vehicle, comprising such a V2X communication unit.

BACKGROUND

In order to save fuel through reduced air resistance, a plurality of vehicles can travel in a coordinated manner at close distances behind one another on a roadway as a group of vehicles or platoon. For this purpose, it is possible for the spacing between the individual vehicles in this platoon to be decreased below what is now generally considered safe, if the vehicles coordinate with one another via wireless vehicle-to-everything (V2X) communication, thereby reducing their reaction times.

V2X communication is made possible by a V2X module which is installed in the respective vehicles of the platoon. The V2X module comprises a control unit, receiving unit, and a transmitting unit, and is connected to at least one antenna. Via the antenna, V2X signals can be received from the surroundings and emitted into the surroundings. The V2X signals are transmitted in a non-contact manner between vehicles (V2V) and/or between vehicles and infrastructure facilities (V2I). The receiving unit processes the received V2X signals, and the transmitting unit generates corresponding V2X signals for transmission into the surroundings. The control unit controls the V2X module. Such an exemplary configuration is depicted in DE 102014220107 A1 or JP 2017022497A2.

Conventionally, the V2X module is installed at any arbitrary place in the ego vehicle, and the antenna is attached to the outside of the ego vehicle, so that reliable transmission of the V2X signals between the vehicles or between the ego vehicle and infrastructure facilities is made possible. In the case of long ego vehicles, in particular semi-tractor-trailer trucks, trucks having drawbar trailers, etc., the V2X module is installed centrally in the tractor vehicle, wherein either one antenna can be arranged centrally on the roof, or two antennas can be arranged on both sides of the tractor vehicle. An arrangement comprising such an antenna on the tractor vehicle of a longer ego vehicle is depicted, for example, in SE 1750416 A1. By providing two lateral antennas, it is possible to minimize an occlusion area beside and behind the ego vehicle, in which transmission of the V2X signals is impaired by the trailer and its load.

However, it is disadvantageous that, due to the length of the ego vehicle, the material of the trailer, and the load thereof, a certain occlusion area will always remain, in which the signal quality of the V2X signals is limited. As a result, safe and reliable data transmission via the V2X communication cannot be ensured, and accordingly, safe driving operation, for example, in a platooning mode, cannot be ensured, since relevant data cannot be transmitted under certain circumstances.

SUMMARY

In an embodiment, the present invention provides a vehicle-to-everything (V2X) communication unit for wirelessly transmitting and/or receiving V2X signals comprising data in a vehicle. The V2X communication unit includes a plurality of V2X modules. Each respective V2X module is connected to at least one antenna configured to transmit and/or receive the V2X signals in a transmission and reception area. Each respective V2X module comprises at least a transmitting unit configured to modulate data to be transmitted via the V2X signals, and/or a receiving unit configured to demodulate data received via the V2X signals. Each V2X module includes a data interface configured to transmit the data to be transmitted and/or the data received via the V2X signal and a logic module. The plurality of V2X modules includes at least two spatially separated V2X modules. The logic module is configured to link the at least two V2X modules in such a way that a logical unit is configured from the at least two V2X modules, the logical unit having a combined transmission and reception area in which the V2X signals comprising the data can be transmitted and/or received.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
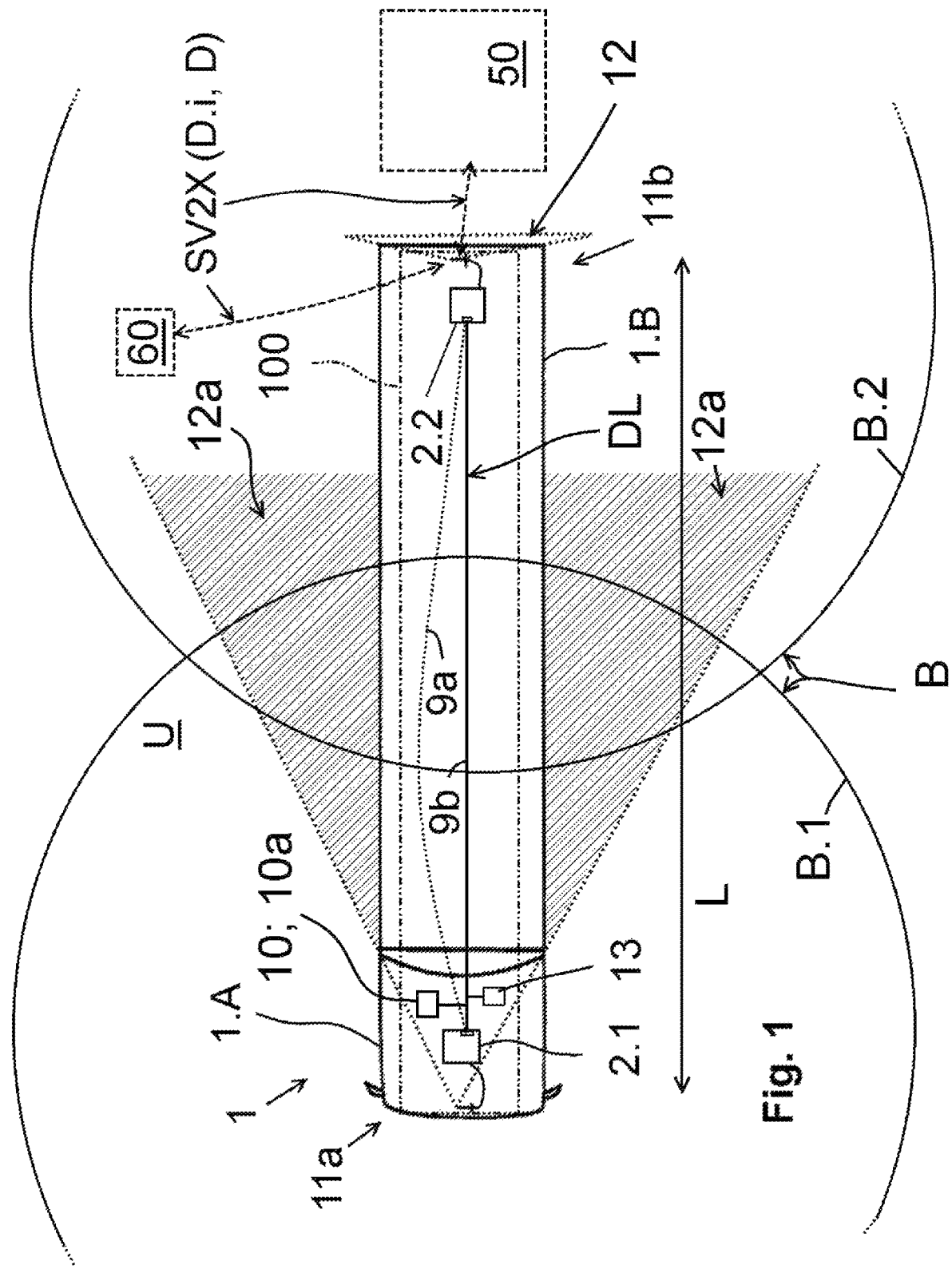
FIG. 1 illustrates an ego vehicle comprising a vehicle-to-everything (V2X) communication unit.

The present disclosure provides a vehicle-to-everything (V2X) communication unit which enables the safe, wireless transmission of data via coordinated data forwarding, even in longer ego vehicles. Furthermore, the present disclosure provides an ego vehicle having such a V2X communication unit.

According to the present disclosure, a V2X communication unit is provided that comprises at least two spatially separated V2X modules and a logic module, wherein the logic module is configured to link the at least two V2X modules logically in such a way that a logical unit is configured from the at least two V2X modules, which has a combined or extended transmission and reception area in which the V2X signals comprising the data can be transmitted and/or received.

Within the scope of the present invention, the term "logical unit" is to be understood to mean that the at least two V2X modules are linked as separate, independent units by the logic module, such that a coordinated evaluation and/or transmission of data can take place. Thus, the V2X modules are not operated independently from one another as separate units, but rather are interdependent. This can take place based on certain criteria which specify which data are to be used by which V2X module in the current ambient situation, in order to enable reliable data transmission, i.e., the transmission and/or reception of V2X signals.

Advantageously, it can thereby be achieved that at least two spatially separated V2X modules are available, rather than being able to access the data and functionality of only one V2X module. As a result, it is possible to increase the reliability of the information or data transmission, since, in the case of outages, insufficient accessibility due to ranges which are too long, or poor signal quality, it is possible to access another spatially separated V2X module in order to perform the functionality. Thus, the spatial extent or accessibility of the individual transmission and reception areas can be extended.

The V2X communication unit, which is provided for wirelessly transmitting and/or receiving V2X signals comprising data, in an ego vehicle, in particular a commercial vehicle, accordingly comprises at least two V2X modules, wherein each V2X module is connected to at least one antenna for transmitting and/or receiving the V2X signals in a transmission and reception area which is associated with the respective antenna. By linking the at least two V2X modules, the transmission and reception areas are accordingly also linked to form a combined transmission and reception area. Preferably, it is accordingly provided that the logic module logically links the at least two V2X modules in such a way that a combined transmission and reception area is formed which is extended with respect to the at least two individual transmission and reception areas, and thus covers a greater area in the surroundings. Preferably, it can furthermore be provided that each V2X module is connected to additional antennas in order to extend the combined transmission and reception area.

A V2X module comprises at least:
one transmitting unit for modulating data to be transmitted via the V2X signals, and/or
one receiving unit for demodulating data received via the V2X signals, and
one data interface for transmitting data to be transmitted and/or received via the V2X signal.

Thus, each V2X module forms an individually functioning unit which is linked to other functioning V2X modules via the logic module to form a logical unit.

According to one preferred refinement, it is provided that the at least two V2X modules are interconnected indirectly or directly via a data connection, by means of the data interfaces, for transmitting the data between the at least two V2X modules. Accordingly, a correspondingly designed data connection is provided which, for example, can span the length of the ego vehicle, in the ego vehicle in which the V2X modules are arranged spatially distanced from one another. Thus, a reliable connection is established which extends the transmission and reception area of the V2X communication unit, since the area spanned by the data connection cannot necessarily be spanned by the V2X communication. It is then possible to exchange data via this data connection if only one V2X module is capable of transmitting or receiving V2X signals from the surroundings in its own transmission and reception area.

It can be preferably provided that the data connection is a wireless data connection and/or a wired data connection. As a result, it is simple to use a data connection which is already present in the ego vehicle, for example, an Ethernet connection, for the data transmission, or to facilitate simple retrofitting via the wireless data connection.

According to a preferred refinement, it is provided that the logic module is indirectly or directly connected to at least one of the at least two modules via the data connection, for logically linking the at least two V2X modules via the data connection. Accordingly, the at least two V2X modules can be coordinated by the logic unit via the data connection, in that said logic unit, for example, monitors and evaluates the data transmitted via the data transmission in order to determine which data are usable and can be logically linked.

According to a preferred refinement, in addition, it is provided that the logic module is a component of one of the at least two V2X modules, preferably a component of a control unit of the respective V2X module. For this purpose, the logic unit can, for example, be a hardware and/or software extension in the respective V2X module, thus requiring minimal installation effort and little space.

According to a preferred refinement, it is provided that the logic module is configured to merge the data which are to be transmitted and/or which are received, of the at least two V2X modules, and to output said data as merged data for logically linking the at least two V2X modules. As a result, the information density and quality can be increased, and malfunctions and signal errors can be corrected, if the at least two V2X modules at least still provide data. The merged data can then be transmitted via the V2X signal or used in the ego vehicle itself.

According to a preferred refinement, it can be provided that the logic module is configured to select the data which are to be transmitted and/or which are received, of the at least two V2X modules, as a function of a signal strength, and to output said data for further processing, for logically linking the at least two V2X modules. Accordingly, it is advantageously possible to check which of the V2X modules provides reliable data, and the data of this V2X module or of these V2X modules can be reused, for example for transmission via the V2X signal or for use in the ego vehicle. If several V2X modules are functional, a merger of the data can take place, such that it is possible to access the data of all V2X modules in order to process said data further. It can also be provided that different V2X modules provide different data, because, for example, each V2X module receives V2X signals from different sources in the surroundings, or transmitted V2X signals have different receivers. This can be detected by the logic module and correspondingly taken into consideration during processing, by, for example, linking the different data in order to increase the information density, it then being possible to process said data correspondingly in the ego vehicle and/or to output said data via the V2X signal to other vehicles in the surroundings.

According to a preferred embodiment, it is provided that each V2X module comprises a position determination device, wherein the respective position determination device is configured to determine a position of the respective V2X module and/or of the position determination device, and to output it as a position signal for further processing. As a result, it is possible to access several items of position information which determine spatially separated positions, which in turn can be used for positioning and orienting the V2X communication unit.

According to a preferred refinement, it is provided that the logic module is configured to determine a reference point from the position signals, wherein the reference point lies between the determined positions. Accordingly, a more exact localization of the V2X communication unit, or of a reference point to said unit, can take place, if the position signals contain an error, for example, due to an average formation made up of the several positions.

According to a preferred refinement, it is provided that the logic module is configured to determine an articulation angle of a multiple-section ego vehicle comprising the V2X communication device, from the position signals. Accordingly, having knowledge of the geometry of the multiple-section ego vehicle, an articulation angle can easily be at least estimated or plausibility-checked, with the aid of the several positions.

According to the present disclosure, furthermore, an ego vehicle is provided, in particular a commercial vehicle, comprising a V2X communication unit according to the present disclosure, wherein a first V2X module and a first antenna which is connected thereto are arranged in a front area of the ego vehicle, and an at least second V2X module and an at least second antenna which is connected thereto are arranged in a rear area of the ego vehicle, for configuring a combined transmission and reception area which is extended over the length of the entire ego vehicle.

The length of the vehicle can thus be spanned by the data connection, and the transmission and reception area can thus be extended, in a particularly simple manner. Furthermore, only a very few small occlusion areas arise, in which transmission of V2X signals is not possible or is at least impaired, for example, by the load of the ego vehicle and the material of the vehicle body. Furthermore, vehicles which are farther away, traveling behind, and traveling ahead, as well as infrastructure facilities which are on the side of the roadway, can also be reached.

Preferably, this is provided in ego vehicles which comprise at least two vehicle sections, wherein the vehicle sections are interconnected in an articulated manner, wherein at least one V2X module is arranged in each vehicle section. As a result, for example, use may be made of the fact that the data transmission of the ego vehicle driving around a corner is not shadowed by objects, since, via its second V2X module, the second vehicle section which is connected in an articulated manner can still also reach areas around the object which can no longer be reached by the first V2X module in the first vehicle section. Thus, a combined transmission and reception area can be configured which is also extended around objects.

Furthermore, it can preferably be provided that the logic module of the V2X communication unit is configured to determine a center point of the ego vehicle as a reference point, and/or an articulation angle between the two vehicle sections, from the position signals. Accordingly, extended functionality can be achieved via the V2X modules, which are present in any case.

FIG. 1 depicts an ego vehicle 1 which, according to this exemplary embodiment, is divided into two vehicle sections 1.A, 1.B, wherein the first vehicle section 1.A is the tractor vehicle (tractor unit), and the second vehicle section 1.B is the trailer (semi-trailer) of the ego vehicle 1. Both vehicle sections 1.A, 1.B are interconnected in an articulated manner. There can be more than two vehicle sections 1.A, 1.B, . . . , for example, in the case of overlong trucks. Furthermore, the ego vehicle 1 can also be a rail-bound ego vehicle comprising one or several cars, or a bus comprising one or several sections (articulated bus). Accordingly, the present invention can be used on any arbitrary ego vehicles 1, wherein the advantage is brought to bear especially in the case of long ego vehicles 1 (single-section or multiple-section).

The ego vehicle 1 comprises a V2X communication unit 100 which, according to FIG. 1, contains two V2X modules 2.1, 2.2 which are respectively connected to an antenna 3.1, 3.2. The first V2X module 2.1 is arranged in a front area 11a of the ego vehicle 1, and the second V2X module 2.2 is arranged in a rear area 11b of the ego vehicle 1. The V2X communication unit 100 can also comprise a larger number N of V2X modules 2.i, where i=1, 2, . . . N, where N>2, wherein the V2X modules 2.i are then equally distributed over the entire ego vehicle 1.

Within the scope of the present invention, V2X (vehicle-to-everything) refers to a wireless communication capability which enables an ego vehicle 1 comprising a V2X module 2.i to provide and/or receive V2X signals SV2X via a particular interface or according to a particular protocol, in order, for example, to coordinate with other vehicles 50 in surroundings U or to receive information from infrastructure facilities 60 in the surroundings U. If such communication flows directly between two vehicles, 1, 50, it is referred to as V2V (vehicle-to-vehicle) communication. However, communication is also possible between an ego vehicle 1 and an infrastructure facility 60 at the edge of the roadway, which is then referred to as V2I (vehicle-to-infrastructure) communication.

For example, a short-range DSRC (dedicated short-range communication) connection or a wireless connection according to one of the IEEE standards, for example, IEEE 802.11 (wireless access in vehicular environments (WAVE)) or IEEE 802.11p (compare IEEE 802.11 wireless LAN medium access layer (MAC)) or IEEE 802.3 (Ethernet), can be used as a transmission mode between the vehicles 1, 50 or between the ego vehicle 1 and the infrastructure facility 60. The V2X module 2.i can, for example, enable signal transmission via WiFi, WLAN, Ultra Mobile Broadband (UMB), Bluetooth (BT), Near Field Communication (NFC), Radio-Frequency identification (RFID), Z-wave, ZigBee, Low power Wireless Personal Area Networks (6LoWPAN), Wireless Highway Addressable Remote Transducer (HART) Protocol, Wireless Universal Serial Bus (USB), or via optical communication options, for example, Infrared Data Association (IrDA). Alternatively, however, transmissions via the (mobile radio) standards 3GPP LTE, LTE-Advanced, E-UTRAN, UMTS, GSM, GSM/EDGE, WCDMA, Time Division Multiple Access (TDMA), Frequency Division Multiple Access (FDMA), Orthogonal FDMA (OFDMA), Single-Carrier FDMA (SC-FDMA), Worldwide Interoperability for Microwave Access (WiMax), Ultra Mobile Broadband (UMB), High Speed Packet Access (HSPA), Evolved Universal Terrestrial Radio Access (E-UTRA), Universal Terrestrial Radio Access (UTRA), GSM EDGE Radio Access Network (GERAN), etc., are also possible.

Figure 1A:
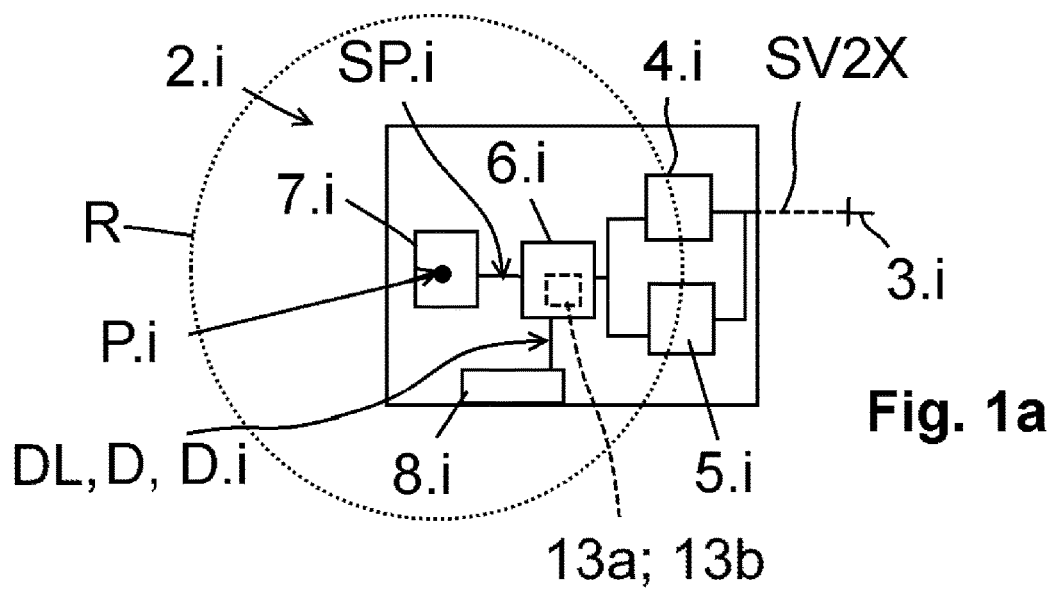
FIG. 1*a* provides a detailed view of a V2X module.

For this purpose, according to FIG. 1a, each V2X module 2.i comprises a transmitting unit 4.i, a receiving unit 5.i, a control unit 6.i, a position determination unit 7.i, and a data interface 8.i. An arbitrary data connection 9 is configured between the data interfaces 8.i of the two V2X modules 2.1, 2.2 and possibly other non-depicted V2X modules (see FIG. 1), such that data transmission between the at least two V2X modules 2.1, 2.2 is enabled inside the ego vehicle 1. The data connection 9 can be a wireless data connection 9a or a wired data connection 9b, for example, a standardized network connection, in particular an Ethernet connection, in the ego vehicle 1, which other facilities can also access.

Via the antennas 3.1, 3.2, V2X signals SV2X can be received from a transmission and reception area B.1, B.2 of the surroundings U around the ego vehicle 1, or can be transmitted by the ego vehicle 1 into the surroundings U. The V2X signals SV2X can be transmitted or received either by another vehicle 50 in the surroundings U, or by an infrastructure facility 60 in the surroundings U around the ego vehicle 1. The respective antenna 3.*i* is connected to the transmitting unit 4.*i* and to the receiving unit 5.*i* of the respective V2X module 2.*i*. The transmitting unit 4.*i* ensures that data to be transmitted D.i are modulated in such a way that said data can be transmitted in the V2X signal SV2X into the surroundings U via the antenna 3.*i*. The receiving unit 5.*i* in turn ensures demodulation of V2X signals SV2X received from the surroundings U, such that the data D.i transmitted via said signals can be further processed in the ego vehicle 1. The control unit 6.*i* controls the individual elements of the V2X module 2.*i*.

The data D.i to be transmitted or received in the V2X signal SV2X via the transmitting unit 4.*i* or the receiving unit 5.*i* can be transmitted before the modulation or after the demodulation, to or from a platooning control system 10 in the ego vehicle 1, via the data interfaces 8.*i*, for example, also via the data connection 9. With the aid of the received data D.i, said platooning control system can regulate the driving dynamics of the ego vehicle 1 in a coordinated manner and also provide data D.i which are to be output, via the respective V2X module 2.*i*, from the host ego vehicle 1 to other vehicles 50 or the infrastructure facilities 60. In addition to the platooning control system 10, other application units 10*a* are also possible, which process the data D.i which are to be transmitted or which are received in the ego vehicle 1.

Furthermore, via the position determination unit 8.*i*, an absolute position P.i (see FIG. 1*a*) of the V2X module 2.*i* can be determined in space, and a corresponding position signal SP.i can be output. The absolute space coordinates of the position determination unit 8.*i* or of the V2X module 2.*i* can be derived from the position signal SP.i. The position determination can, for example, take place via GPS, GLONASS, Galileo, Compass, etc. The position signal SP.i or the position P.i can be transmitted to the platooning control system 10 and/or another application unit 10*a*, and/or via the V2X module 2.*i* in the V2X signal SV2X.

The described design of the V2X communication unit 100 comprising the two V2X modules 2.*i* enables combined or coordinated operation in which the two V2X modules 2.*i* form a logical unit. This has the advantage that an additional transmission or reception capability is provided in the ego vehicle 1 by means of the second V2X module 2.2, wherein both V2X modules 2.1, 2.2 are distributed over the entire length L of the ego vehicle 1, such that, by means of the V2X communication unit 100, a reception and transmission area B is covered, which is combined from the two individual reception and transmission areas B.1, B.2, and which is greater than in the hitherto existing prior art.

Furthermore, by means of the arrangement of the second V2X module 2.2 in the rear area 11*b* of the ego vehicle 1, an occlusion area 12, in which transmission of the V2X signals SV2X is impaired due to the extent and the material of the trailer 1.B, can be significantly reduced with respect to the prior art. Accordingly, the partial occlusion area 12*a*, which can be covered by the first V2X module 2.1 only to a limited extent, can be covered by the second V2X module 2.2. The remaining occlusion area 12 which is depicted in FIG. 1 is then very small and is no longer relevant for communication with other vehicles 50 or infrastructure facilities 60.

In addition, by means of the V2X communication unit 100 according to the present invention, it can be ensured that it is still possible to communicate with the following vehicle 50 even if the ego vehicle 1 is very long, since the spacing between the second V2X module 2.2 and the following vehicle 50, which also comprises such a V2X module, is small. The length L of the ego vehicle 1 is thus at least partially spanned via the internal vehicle data connection 9; 9*a*, 9*b*. Thus, if a following vehicle 50 or the infrastructure facility 60 in the surroundings U can no longer be reached via the first V2X module 2.1 due to a distance which is too great, it is always possible to access the second V2X module 2.2.

Figure 2:
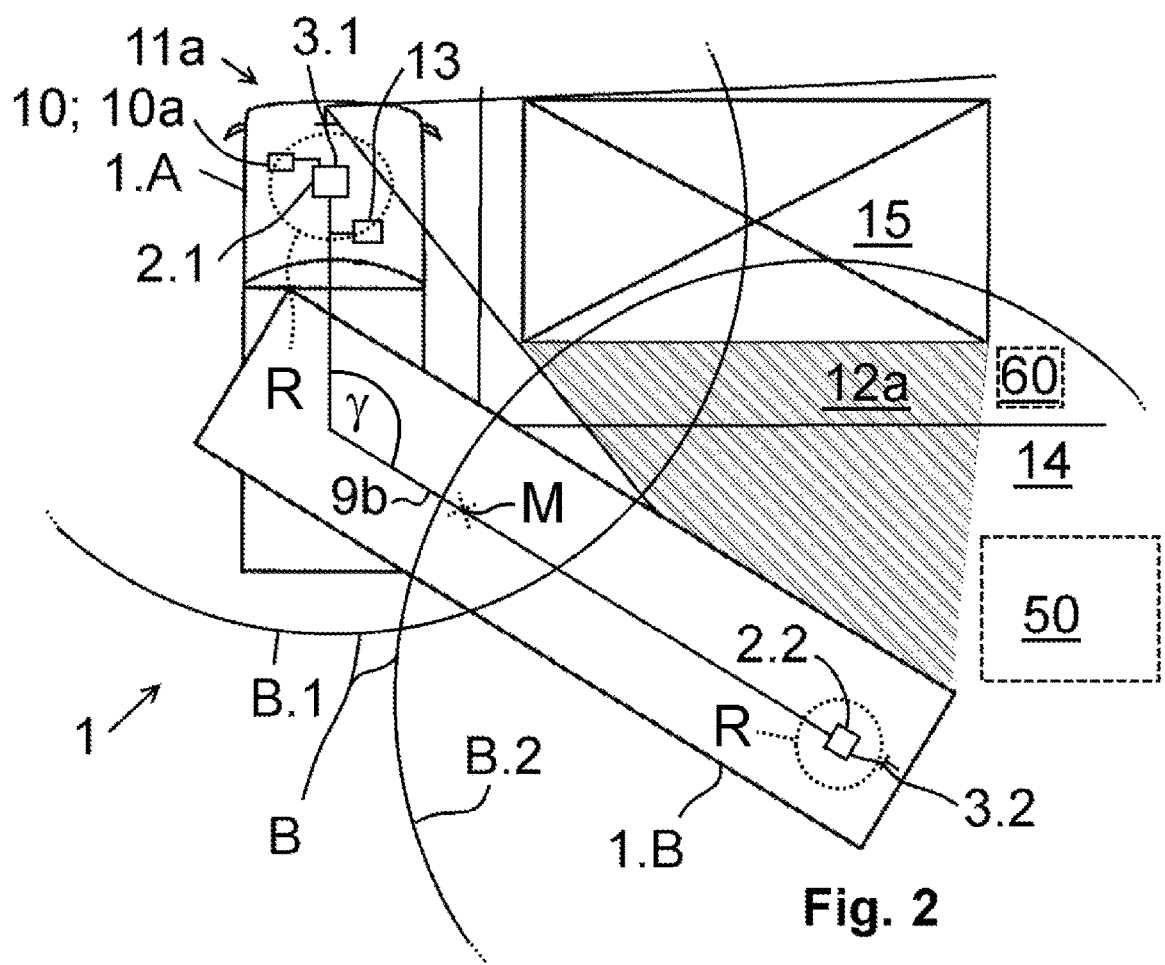
FIG. 2 illustrates the ego vehicle according to FIG. 1, during a turning maneuver.

A further advantage results from FIG. 2. Accordingly, for example, it may happen that during a turning situation, the V2X communication is impaired by an object 15 which is arranged on the side of the roadway 14, for example, a house. As a result, V2X signals SV2X transmitted by the first V2X module 2.1 cannot be received in the partial occlusion area 12*a* in which another vehicle 50 or an infrastructure facility 60 is possibly situated. Likewise, V2X signals SV2X transmitted by said vehicle or infrastructure facility (50, 60) cannot be received by the first V2X module 2.1 if they are in the partial occlusion area 12*a*. However, since the second V2X module 2.2 is present in the rear area 11*b* of the ego vehicle 1, the partial occlusion area 12*a* can be covered by the second V2X module 2.2. Thus, by means of the interaction of the two V2X modules 2.*i* as a logical unit, the tractor vehicle 1.A can see around the corner, despite the object 15. Simultaneously, by drawing on the first V2X module 2.1, it is possible to continue to cover the area in front of the ego vehicle 1, such that by means of a logical link of both V2X modules 2.*i*, it is possible to cover an extensive transmission and reception area B which is also extended around the corner, despite the interjacent object 15.

Control of the logical unit from the first and second, and possibly other V2X modules 2.*i*, takes place in a logic module 13 which is linked via the data interfaces 8.*i* to the two V2X modules 2.*i* via the data connection 9; 9*a*, 9*b* and/or in another manner. The logic module 13 can also be implemented in one of the V2X modules 2.*i*, for example, in the control unit 6.*i*, for example, as a hardware or software adaptation 13*a*, 13*b* (see FIG. 1*a*). Using certain criteria, the logic module 13 ascertains the V2X module or modules 2.*i* to be used for transmission (emission and reception) of data D.i or V2X signals SV2X. For example, if nothing is received by the first V2X module 2.1, or if the signal quality C or the signal strength is too poor, the V2X module 2.2 can be queried by the logic module 13, or vice-versa. Simultaneously, it can be determined whether the two V2X modules 2.*i* receive different V2X signals SV2X, for example, in the turning situation according to FIG. 2. For this purpose, logic data DL are also transmitted by the logic module 13 via the data connection 9, wherein the logic data DL enable control of the logical unit from the at least two V2X modules 2.*i*.

The subsequent data processing can be coordinated by the logic module 13, which then, for example, can determine the V2X module 2.*i* from which the data D.i is transmitted to the platooning control system 10 or the respective application unit 10*a* in the ego vehicle 1, or the V2X module 2.*i* via which the respective data D.i are transmitted via the V2X signal SV2X into the surroundings U. For example, the second V2X module 2.2 can always be used for the data connection to a following vehicle 50, and only the first V2X module 2.1 can always be used for transmitting to the front or from the front, thereby increasing the reliability of the data transmission.

Furthermore, the logic module 13 can also determine that the data D.i of both V2X modules 2.*i* are merged, and merged data D are output, in order to increase the accuracy or to perform a plausibility check if both V2X modules 2.*i* provide the same V2X signal SV2X, or in order to increase the information density if, for example, in FIG. 2, the two V2X modules 2.i provide different V2X signals SV2X.

In addition, it is possible to configure further functionality on the basis of the internal vehicle data connection 9 or the logical connection of the V2X modules 2.i. Accordingly, the positions P.i of the two V2X modules 2.i, which are provided by the respective position determination facilities 7.i, can be used to determine a positioning or an orientation of the ego vehicle 1 more precisely. Normally, each position determination contains an error, such that, from a determined position P.i, it is possible only to infer that the ego vehicle 1 or the V2X module 2.i is situated in the area around this position P.i within a certain error radius R (see FIGS. 1a, 2). If the position of the two V2X modules 2.i in the ego vehicle 1 is now known, it can be inferred from the two determined positions P.i and the respectively associated error radii R, which are assumed here to be identical for each V2X module 2.i or for each position determination device 7.i, that a center point M of the ego vehicle 1 must be situated in the area between the two positions P.i. The determination of the positioning of the ego vehicle 1 is therefore improved. This determination can be further improved if an articulation angle γ is known in the case of a multiple-section ego vehicle 1. On the other hand, for determining the orientation of the ego vehicle 1, it is also possible to determine the articulation angle γ itself from the positions P.i of the V2X modules 2.i, having a certain level of accuracy.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Ego vehicle
1.A First vehicle section
1.B Second vehicle section
2.i V2X module
3.i Antenna
4.i Transmitting unit
5.i Receiving unit
6.i Control unit
7.i Position determination unit
8.i Data interface
9 Data connection
9a Wireless data connection
9b Wired data connection
10 Platooning control system
10a Application unit
11a Front area of the ego vehicle 1
11b Rear area of the ego vehicle 1
12 Occlusion area
12a Partial occlusion area
13 Logic module
13a Logic module as software
13b Logic module as hardware
14 Roadway
15 Object
50 Vehicle in the surroundings U
60 Infrastructure facility
100 V2X communication unit
B.i Transmission and reception area of the i-th V2X module 2.i
B Combined transmission and reception area
D.i Data
D Merged data
DL Logic data
γ Articulation angle
M Center point of the ego vehicle 1
N Number of V2X modules 2.i
O Orientation
P.i Position
Pos Positioning
R Error radius
SP.i Position signal
SV2X V2X signal
U Surroundings

What is claimed is:

1. A vehicle-to-everything (V2X) communication unit for wirelessly transmitting and/or receiving V2X signals comprising data in a vehicle, the V2X communication unit comprising:
   a plurality of V2X modules, wherein each respective V2X module is connected to at least one antenna configured to transmit and/or receive the V2X signals in a transmission and reception area, wherein each respective V2X module comprises at least:
      a transmitting unit configured to modulate data to be transmitted via the V2X signals, and/or
      a receiving unit configured to demodulate data received via the V2X signals, and
      a data interface configured to transmit the data to be transmitted and/or the data received via the V2X signal; and
   a logic module,
   wherein the plurality of V2X modules includes at least two spatially separated V2X modules a first of the at least two V2X modules and the respective at least one antenna being arranged in a front area of the vehicle and a second of the at least two V2X modules and the respective at least one antenna being arranged in a back area of the vehicle, and
   wherein the logic module is configured to link the at least two V2X modules in such a way that a logical unit is configured from the at least two V2X modules, the logical unit having a combined transmission and reception area in which the V2X signals comprising the data can be transmitted and/or received.

2. The V2X communication unit as claimed in claim 1, wherein the at least two spatially separated V2X modules are interconnected indirectly or directly via a data connection, via the data interfaces, for transmitting, between the at least two spatially separated V2X modules, the data to be transmitted and/or to be received, and/or logic data for logically linking the at least two spatially separated V2X modules.

3. The V2X communication unit as claimed in claim 2, wherein the data connection is a wireless data connection and/or a wired data connection.

4. The V2X communication unit as claimed in claim 2, wherein the logic module is connected indirectly or directly to at least one of the at least two spatially separated V2X modules via the data connection, for logically linking the at least two spatially separated V2X modules via the data connection.

5. The V2X communication unit as claimed in claim 1, wherein the logic module logically links the at least two spatially separated V2X modules in such a way that a combined transmission and reception area is formed which extends over at least two individual transmission and reception areas.

6. The V2X communication unit as claimed in claim 1, wherein the logic module is a component of one of the at least two spatially separated V2X modules, wherein the logic module is designed as software and/or as hardware.

7. The V2X communication unit as claimed in claim 1, wherein the logic module is configured to merge the data which are to be transmitted and/or which are received, of the at least two spatially separated V2X modules, and to output the data as merged data for logically linking the at least two spatially separated V2X modules.

8. The V2X communication unit as claimed in claim 1, wherein the logic module is configured to select the data which are to be transmitted and/or which are received, of the at least two spatially separated V2X modules, as a function of a signal strength, and to output the data for further processing, for logically linking the at least two spatially separated V2X modules.

9. The V2X communication unit as claimed in claim 1, wherein each respective V2X module further comprises a position determination device, wherein the respective position determination device is configured to determine a position of the respective V2X module and/or of the position determination device, and to output it as a position signal.

10. The V2X communication unit as claimed in claim 9, wherein the logic module is configured to determine a reference point from the position signals, wherein the reference point lies between the determined positions.

11. The V2X communication unit as claimed in claim 9, wherein the logic module is configured to determine an articulation angle of a multiple-section vehicle comprising the V2X communication device, from the position signals.

12. An ego vehicle comprising:
the V2X communication unit as claimed in claim 1,
wherein the first V2X module and a first antenna connected thereto are arranged in a front area of the ego vehicle, wherein the second V2X module and a second antenna connected thereto are arranged in a rear area of the ego vehicle, for configuring a combined transmission and reception area which is extended over a length of the entire ego vehicle.

13. The ego vehicle as claimed in claim 12, wherein the ego vehicle comprises at least two vehicle sections, wherein the vehicle sections are interconnected in an articulated manner, wherein at least one V2X module is arranged in each vehicle section.

14. The ego vehicle as claimed in claim 13, wherein the logic module of the V2X communication unit is configured to determine a center point of the ego vehicle as a reference point, and/or an articulation angle between two vehicle sections, from position signals.

* * * * *